Nov. 10, 1925.  
E. E. WEMP  
CLUTCH  
Filed Dec. 24, 1923
1,560,957
2 Sheets-Sheet 2
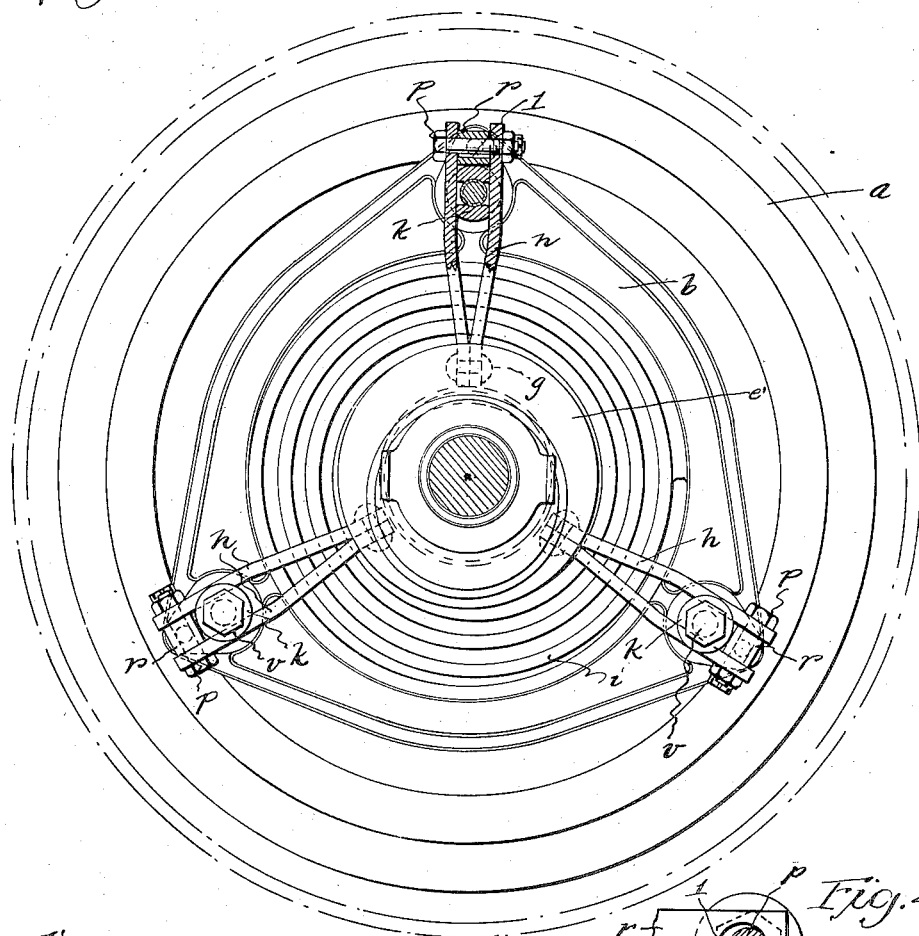
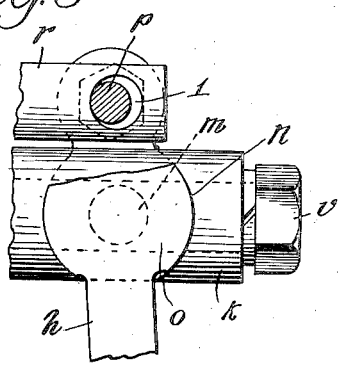
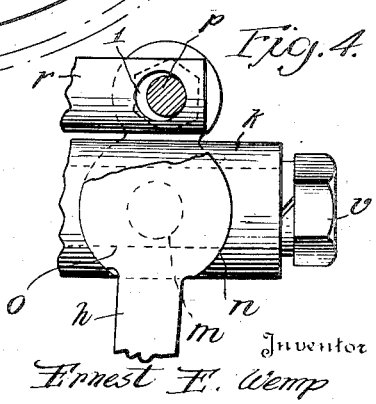
Inventor  
Ernest E. Wemp  
By Stuart C. Barnes.  
Attorney Patented Nov. 10, 1925.

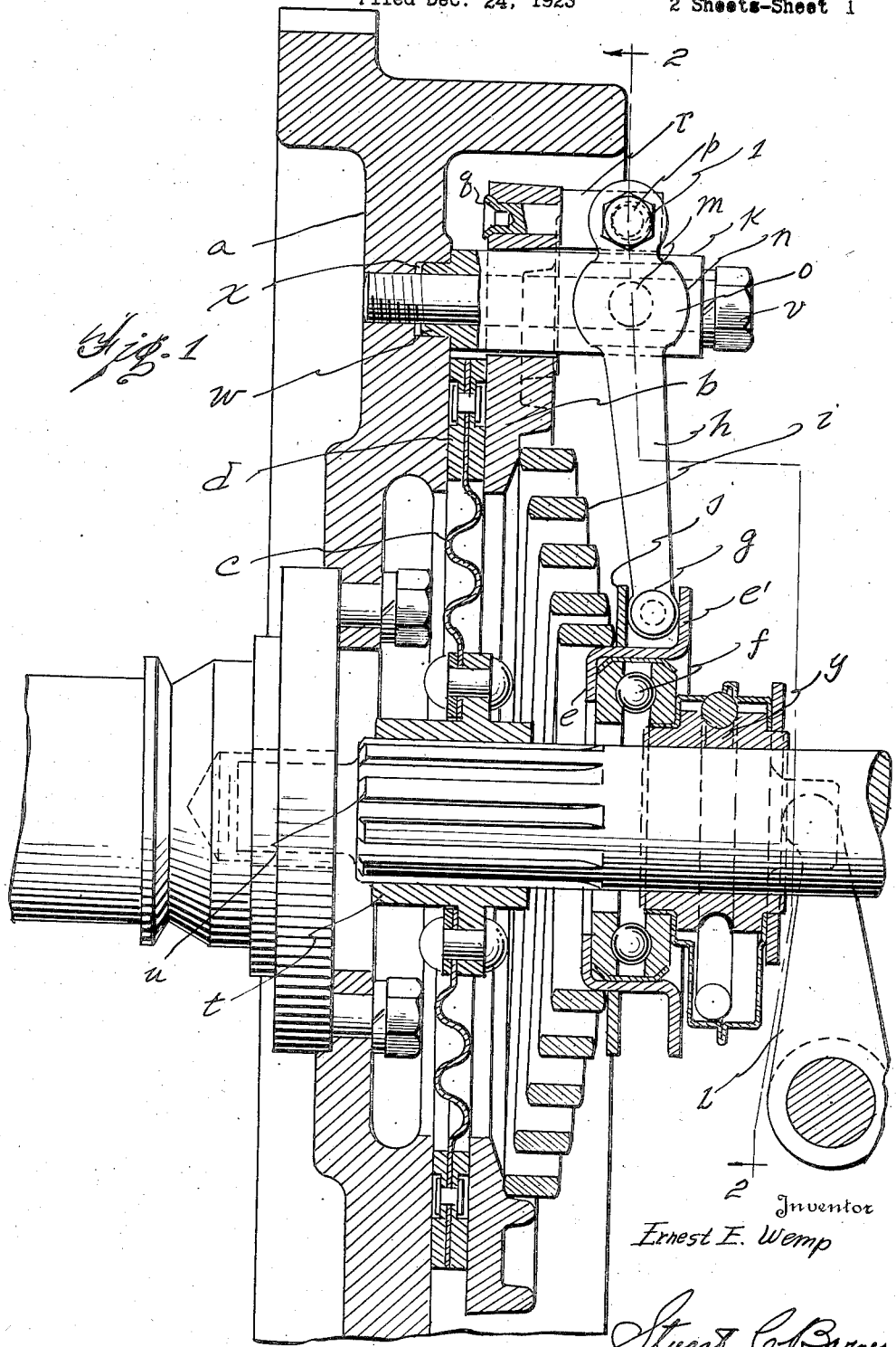

1,560,957

UNITED STATES PATENT OFFICE.

ERNEST E. WEMP, OF DETROIT, MICHIGAN.

CLUTCH.

Application filed December 24, 1923. Serial No. 682,446.

*To all whom it may concern:*

Be it known that I, ERNEST E. WEMP, a citizen of the United States, residing at Detroit, in the county of Wayne and State of Michigan, have invented certain new and useful Improvements in Clutches, of which the following is a specification.

This invention relates to clutches and has for its object an improved and simplified clutch especially designed for automobiles, but which will obviously have a broader application. It is the object of the invention to provide a clutch assembly which entirely eliminates a cover plate. In place of the usual cover plate or abutment plate, a plurality of hollow posts are used in conjunction with pressure-transmitting levers.

These hollow posts, the thrust ring, the pressure-transmitting levers, and the clutch spring are so arranged by reason of a permissible lost motion that in letting in the clutch the direct spring pressure is gradually exerted upon the clutch discs and then secondly a multiplied pressure due to a system of levers. Likewise in releasing the clutch, first the heavy multiplied pressure is released and then the direct but weaker pressure of the spring is gradually released, thereby securing an easier action in clutching and declutching. This will more fully appear when a complete detailed description of my improved clutch is given.

Fig. 1 is a longitudinal section of the clutch.

Fig. 2 is a section taken on the line 2—2 of Fig. 1.

Fig. 3 is an enlarged section showing the lost motion connection when the clutch is engaged.

Fig. 4 is a similar section when the clutch is disengaged.

The fly wheel is designated $a$ and forms one of the engaging clutch faces. The other driving clutch face is furnished by an iron casting $b$ which forms the thrust ring. A driven disc $c$ intervenes between the two driving members and is provided with the usual clutch facings $d$. This driven clutch member preferably has a web portion which is annularly corrugated as shown in the drawings. This is more fully described and claimed in my copending application Serial No. 682,445. Inasmuch as it forms no part of my present invention, the same is not here claimed.

A clutch collar $e$ is supported on the thrust ball bearings $f$. This clutch collar is provided with an upturned flange $e'$, which engages with the power arms $g$ of the pressure-transmitting levers $h$. The large spiral spring $i$ engages between the thrust ring and the smaller ring $j$ which bears against the power arm ends of the levers.

These levers $h$ are fulcrumed on the hollow posts $k$. These posts are bored at $m$ and counterbored at $n$ on each side to form seats for the two stamped metal strips that together form the arm. It will be seen from examining Fig. 2, that each arm is made up of two stampings. The two stampings straddle the post and are provided with enlarged sectors $o$ near their outer ends. These sectors $o$ form rockers on which the levers rock on their fulcrums, the fulcrums being the posts. The outer ends of the levers are bolted with the bolt $p$ to a special automatic screw machine stud $r$. The reduced and bored outer end of this stud can be turned over as at $q$ to rivet the stud to the iron thrust member. This riveting of the end of the stud over as at $q$ unites the thrust ring, the clutch spring, the posts, the levers, the thrust collar, the ball bearings, and the appurtenant thrust-transmitting members from the clutch pedal into a unit of assembly. Now all that is necessary to do to mount the clutch on the job is to slip the splined sleeve $t$ onto the splined end $u$ of the driven shaft, after the unit assembly has already been assembled onto the shaft. The cap screws $v$ may then be passed through the hollow posts and turned into the tapped sockets in the fly wheel. This assembles the posts on the fly wheel. The posts are provided with reduced and extended ends $w$ for centering the posts in the counter-bored holes $x$ in the fly wheel. These posts take the place of the ordinary driving studs that are required with the usual clutch assembly. The cover plate is wholly eliminated as the levers are mounted on the studs in place of on the cover plate.

It will be apparent that when the unit assembly is removed from the fly wheel by turning out the cap screws $v$ that the clutch spring $i$ can force the thrust ring $b$ outwardly only a small distance, as obviously the levers $h$ will cramp in their sockets $n$ when they have been thrown out a given distance. This cramping results in stops being formed on the posts for preventing the levers being thrown out too far and the assembly broken.

Now as to the operation of the clutch: The clutch here shown is one that requires an inward thrust to disengage the clutch discs. Such an inward thrust is communicated to the thrust member $y$ by the lever $z$. This forces the clutch collar $e$ in against the coil spring $i$. The levers $h$ rock on the posts and pull the studs $r$ outwardly, thereby releasing the thrust ring and declutching. In letting in the clutch, the operator of course lets the lever $z$ turn backward, clockwise. This gradually lets in first the direct pressure of the spring $i$ and gradually lets in the multiplied pressure that is transmitted through the levers $h$. By reason of the enlarged hole $l$, through the stud $r$, there is enough lost motion so that the direct pressure and the multiplied pressure is not coincidently applied or released. For instance, in letting the clutch in, this clearance of about $\frac{1}{32}$ of an inch gives a $\frac{1}{32}$ of inch lost motion. The direct clutch spring is free to immediately thrust the discs together. However, the levers must move through $\frac{1}{32}$ of an inch at their load ends, and if the levers are of a 5 to 1 ratio, they have to move through $\frac{5}{32}$ of an inch at their power ends before they will become effective. In other words, this small amount of lost motion provided at the load end of the lever permits the main clutch spring only to exert a direct pressure, while the clutch collar $e$ is traveling through $\frac{5}{32}$ of an inch. The range of this independent action of the direct pressure may be altered by altering the clearance between the walls of the hole through the stud and the pin $p$. Similarly, when the clutch is released, the clutch collar may travel through about $\frac{5}{32}$ of an inch of movement before it will become effective upon the direct pressure. When this lost motion is translated into the movement of the clutch pedal, it will be multiplied somewhere in the neighborhood of 50—1, making the foot travel about 1½ inches in which the direct spring pressure is independent of the indirect multiplied spring pressure. This gives a long range of weak spring action in clutching and declutching so as to make the action easy and smooth.

In the claims I have found it desirable to refer to the thrust member as one of the driving members, for in the construction shown, it so functions. However, it might be simply a thrust member with another driving member substituted to furnish its driving function. This is of course well within my invention, and I want it understood that such variations come within the purport of my claims.

What I claim is:

1. In a clutch, the combination of driving and driven members that have faces adapted to engage and including a thrust member, pressure multiplying levers, and a clutch spring, said members being arranged so that in declutching the multiplied pressure is first relieved and then the direct pressure is relieved.

2. In a clutch, the combination of driving and driven members having faces adapted to be engaged and including a thrust member, levers connected with the thrust member, and a spring connected with the levers, said levers having a lost motion connection with the thrust member, and the said spring arranged also to thrust directly on the thrust member, whereby in declutching the multiplied pressure is first relieved and then the direct pressure, and vice versa.

3. In a clutch, the combination of driving and driven members provided with faces arranged to engage including a thrust ring, fixed posts, levers fulcrumed on said fixed posts, lost motion connections between the load ends of the levers and the thrust ring, and a clutch spring thrusting between the power ends of the levers and the thrust ring and arranged so that when the clutch is disengaged the multiplied indirect pressure is first relieved and then the direct pressure, and in letting in the clutch the converse action takes place.

4. In a clutch, the combination of driving and driven members provided with faces arranged to engage and including a thrust ring, studs supported on the thrust ring, posts having a fixed relation, levers for multiplying the pressure fulcrumed on said posts and having lost motion connections with said studs, and a clutch spring thrusting between the power ends of the levers and the thrust ring whereby in declutching the indirect and multiplied pressure is first relieved and then the direct pressure of the spring, and in engaging the clutch the converse action takes place.

5. In a clutch, the combination of driving and driven members provided with faces adapted to engage and including a thrust ring, a plurality of driving posts passing through the thrust ring and secured to one of the driving members, and having approximately circular sockets cut out of their sides, pressure transmitting levers of the first order fulcrumed in said cut out sides of the posts and having their projecting ends tied to the thrust ring, and a spring for exerting pressure on the power ends of said levers.

6. In a clutch, the combination of driving and driven members provided with faces adapted to engage and including a thrust ring, a plurality of hollow posts passing through the thrust ring, cap screws bolting the posts to one of the driving members, a plurality of levers fulcrumed on said hollow posts and tied to the thrust ring, and a spring for exerting pressure on the power ends of the levers.

7. In a clutch, the combination of driving and driven members provided with faces adapted to engage and including a thrust ring, a plurality of hollow posts passing through the thrust ring and having counterbored sides forming fulcrum sockets, cap screws for bolting the hollow posts to one of the driving members, levers having sector portions adapted to be fulcrumed in the fulcrum sockets formed by the counterbores on the sides of the posts, the load ends of said levers being tied to the thrust ring, and a spring exerting pressure on the power ends of the levers.

8. In a clutch, the combination of driving and driven members provided with faces adapted to engage and including a thrust ring, driving posts supported on one of the driving members and passing through the thrust ring, said posts bored to form seats and stops, and pressure transmitting levers having enlarged sectors near their outer ends which are seated in said bored portions of the posts.

9. In a clutch, the combination of driving and driven members provided with faces adapted to engage and including a thrust member, posts passing through the thrust member and engaging removably with one of the driving members, a plurality of levers fulcrumed directly on said posts and tied to said thrust member, and a spring thrusting between the power ends of said levers and the thrust member.

10. In a clutch, the combination of driving and driven members provided with faces adapted to engage and including a thrust member, a plurality of posts passed through openings in the thrust member and removably engaging one of the other driving members, a plurality of levers fulcrumed directly on said posts and having a lost motion tie connection with said thrust member, and a spring thrusting between the power ends of said lever and the thrust member.

11. In a clutch, the combination of driving and driven members, a plurality of driving posts that are arranged to be removably attached to the one driving member, a plurality of pressure-transmitting levers tied to another driving member and fulcrumed on said posts, and a clutch spring thrusting on said levers, said posts being arranged to stop the throw of the levers beyond a given point whereby the levers, the spring, the posts, the ties and the driving member connected with the ties constitute an assembly held together by the levers and the associated members.

12. In a clutch, the combination with a forward driving member of a sub-assembly comprising a rear driving member, a driving post adapted to pass freely through the rear driving member and be removably secured to the forward driving member, a lever pivoted to the post, a stud secured to the load end of the lever and which is secured to the rear driving member and means exerting pressure on the lever which tends to throw the driving members together for the purpose of engaging a driven disc.

13. In a clutch, the combination with a forward driving member of a sub-assembly comprising a hollow driving post, means passing through the hollow driving post for removably securing the same to the forward driving member, a rear driving member through which the post freely passes, a lever fulcrumed on the post, a stud secured to the load end of the lever and which is secured to the rear driving member, and means thrusting between the lever and the rear driving member for forcing the driving members towards each other, the said sub-assembly being arranged to stop such thrust beyond a given limit to hold the parts of the assembly together.

14. In a clutch, the sub-assembly comprising a hollow driving post having its sides cut out to form fulcrum sockets, said posts being capable of attachment to a driving member by means of cap screws passed through the center, a lever made up of a pair of strips connected together and having enlarged portions arranged to fit in the sockets in the sides of the post to form a fulcrum, and a tie secured to the load point of the lever which may be secured to another driving member.

15. In a clutch, a sub-assembly comprising a driving post arranged to be anchored to one of the driving members, a lever fulcrumed on the post, and a tie or stud secured to the load point of the lever by a lost motion connection for the purpose of causing the direct and indirect pressure of the clutch spring to be independently applied or released.

In testimony whereof I have affixed my signature.

ERNEST E. WEMP.